Patented Oct. 11, 1932

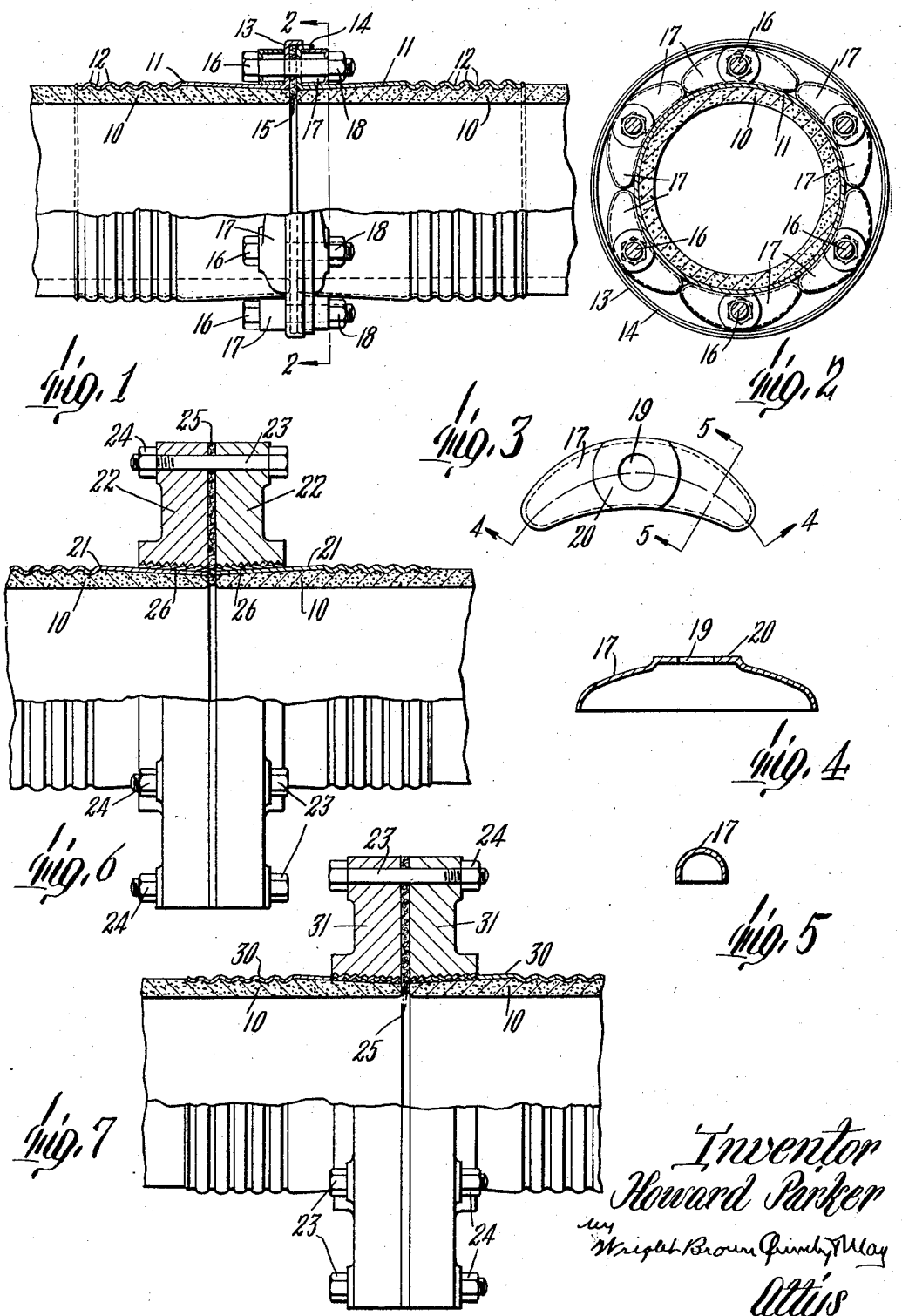

1,881,915

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

COUPLING FOR FIBER PIPE

Application filed March 21, 1930. Serial No. 437,693.

This invention relates to an improved coupling device for securing together the ends of fibrous pipe. Owing to its lightness and strength, as well as its toughness and comparative cheapness, waterproofed fibrous pipe is desirable for many purposes in preference to pipe of other materials. Such pipe has additional advantages since it is not subject to attack by acids or alkalis and, therefore, does not corrode. Practical difficulties, however, have been encountered in the past in devising a simple but efficient coupling means to secure together the ends of successive sections of pipe of this variety. According to the present invention, a coupling is provided which is not only strong, but is also simple and economical.

For a more complete understanding of the invention, reference may be had to the description which follows and to the drawing, of which,—

Figure 1 illustrates a joint between the ends of two sections of fibrous pipe, the view being partly in section.

Figure 2 is a transverse section on the line 2—2 of Figure 1.

Figure 3 is an elevation of one of the elements employed in the coupling shown in Figure 1.

Figure 4 is a section on the line 4—4 of Figure 3.

Figure 5 is a section on the line 5—5 of Figure 3.

Figure 6 is an elevation of a modified form of coupling, the view being partly in section.

Figure 7 is a similar view of another modification.

Referring to the drawing in detail, 10 represents the end portions of fibrous tubes to be coupled together. Tubes of this type may be made of cellulosic pulp which may first be formed in a wet web to be wound upon itself on a mandrel, under pressure, until the desired wall thickness is obtained. Such a tube when properly dried has relatively great mechanical strength and can be impregnated with suitable waterproofing material such as asphalt, pitch or the like. If such tube is to be employed for conducting water or other liquids, the tube should also receive a coating of suitable material such as blown or oxidized asphalt or the like to prevent access of moisture to the interior of the walls.

According to the invention a tube such as described may have its ends suitably shaped by means of a powerful press or by spinning the ends in a lathe. Although the walls of a tube which has been made as hereinbefore described are relatively dense, they are subject to a slight additional compression by which the end portions may be shaped as shown in Figure 1. Prior to the application of such shaping pressure, a sleeve 11 of sheet iron or other suitable material is slipped over the end portion so that when the shaping pressure is applied the sleeve 11 is shaped as well as the tube wall. A portion of the sleeve may be pressed into a series of ridges and depressions as at 12, the outer surface of the tube wall conforming to the wavy shape of the surrounding sleeve. The portion of the sleeve adjacent to the end of the tube may be squeezed so as to taper inward slightly, as shown in Figure 1, if desired. Each sleeve is preferably provided with an outwardly extending flange, the flange 13 on one of the sleeves of the coupling being slightly greater in diameter than the flange 14 of the mating sleeve. The flanges 13 and 14 may be bent over as shown in Figure 1 so that the bent rims may telescope together and provide a relatively tight protective casing. The bent rims also serve to stiffen the flanges. A ring of packing material 15 may be employed between the flanges to make the joint tight. The flanges are each provided with a number of perforations which are suitably spaced to register with each other to receive bolts 16 therethrough. Within the bent up rim of the flange 14, a number of suitable elements 17 may be provided to stiffen the flange 14 by distributing over its entire circumference the pressure of nuts 18 which are set up on the bolts 16. Similarly a set of elements 17 may be employed against the flange 13 to distribute the pressure of the bolt heads thereon.

As shown in Figures 3 to 5 the pressure distributing elements 17 may be solid blocks or struck up sheet metal stampings of general arcuate shape to fit within the rim of the flange 14. Each element 17 is perforated as at 19 to receive a bolt 16, a flat elevated central portion 20 being provided on the upper face of each said element to be engaged by one of the nuts 18. As illustrated in Figures 3, 4 and 5 of the drawing, the elements 17 may be in the form of a shell stamped from sheet metal. This shell may be suitably shaped, as illustrated, for effective distribution of pressure from the nuts 18 on the edge of the shell which presses directly against the flange 14. To this end the elements may be shaped so as to have a nearly circular transverse section at every point, the longitudinal sections being approximately semi-elliptical, as shown in Figure 4. The elements 17 permit the use of relatively thin metal for the sleeves 11. This is both economical and otherwise advantageous in that when made of such metal the sleeves may be more readily pressed to shape on the ends of the fibrous tubes.

A modified form of the invention is illustrated in Figure 6. According to this form of the invention, sleeves 21, similar to the sleeves 11, are pressed or spun on the ends of the fiber tubes 10. These sleeves, however, have no flanges integral therewith. Instead of the integral flanges as in Figure 1, separate flanges 22 are provided, these being preferably of heavy cast metal. A reinforcing collar 26 is welded or otherwise secured to the end portion of each sleeve, the reinforce being sufficiently thick to permit the cutting of a screw thread for engagement with a mating thread on the inner surface of each flange 22. Suitable bolts 23 and nuts 24 may be employed to secure opposing flanges 22 to each other with a gasket 25 between. The flanges 22 are each secured to a corresponding sleeve 21.

A slightly different modification is illustrated in Figure 7. In this form the sleeve 30 is pressed into wavy form over a portion of its length to grip the wall of the fiber tube. In addition, the portion of the sleeve adjacent the end of the tube may be pressed or otherwise formed into the shape of a screw thread on which a flange member 31 may be screwed, or the sleeve may be spot-welded to the flange 31 if these parts are made of metal suitable for the purpose. This flange member may be secured to a similar flange 31 on the abutting pipe as by bolts 23 and nuts 24.

I claim:

1. A coupling for fiber tubing, comprising a pair of sheet metal sleeves fitted on abutting end portions of a pair of fiber tubes and pressed into intimate engagement therewith, said sleeves having portions indenting the walls of the tubes, mating flanges on the abutting ends of said sleeves and substantially flush with the respective ends of said tubes, said flanges having their rims bent to fit one within the other, and means for clamping the flanges together, said clamping means comprising a plurality of bolts passing through said flanges, and nuts on said bolts.

2. A pipe coupling for fiber tubing comprising a pair of sheet metal sleeves fitted on abutting end portions of a pair of fiber tubes, said sleeves having portions pressed into the wall of the tube so as to indent the same, flanges on the abutting ends of said sleeves, and means for clamping said flanges together, said clamping means including a plurality of pressure distributing elements against one of said flanges, a plurality of bolts each passing through said flanges and one of said elements, and a nut on each bolt.

In testimony whereof I have affixed my signature.

HOWARD PARKER.